(12) United States Patent
Hilmi et al.

(10) Patent No.: US 11,495,819 B2
(45) Date of Patent: Nov. 8, 2022

(54) HIGH-PERFORMANCE ELECTROLYTE FOR MOLTEN CARBONATE FUEL CELL

(71) Applicant: FuelCell Energy, Inc., Danbury, CT (US)

(72) Inventors: Abdelkader Hilmi, Bethel, CT (US); Ethan Demeter, Jersey City, NJ (US)

(73) Assignee: FuelCell Energy, Inc., Danbury, CT (US)

( * ) Notice: Subject to any disclaimer, the term of this patent is extended or adjusted under 35 U.S.C. 154(b) by 917 days.

(21) Appl. No.: 16/311,482

(22) PCT Filed: Jun. 21, 2017

(86) PCT No.: PCT/US2017/038575
§ 371 (c)(1),
(2) Date: Dec. 19, 2018

(87) PCT Pub. No.: WO2017/223218
PCT Pub. Date: Dec. 28, 2017

(65) Prior Publication Data
US 2021/0143462 A1 May 13, 2021

Related U.S. Application Data

(60) Provisional application No. 62/353,267, filed on Jun. 22, 2016.

(51) Int. Cl.
*H01M 8/14* (2006.01)

(52) U.S. Cl.
CPC ...... *H01M 8/145* (2013.01); *H01M 2008/147* (2013.01); *H01M 2250/20* (2013.01); *H01M 2300/0051* (2013.01)

(58) Field of Classification Search
None
See application file for complete search history.

(56) References Cited

U.S. PATENT DOCUMENTS 6,153,257 A * 11/2000 Hong .................. H01M 4/8885
427/115
6,986,970 B1 * 1/2006 Kumar ............. H01M 10/4235
429/188

(Continued)

OTHER PUBLICATIONS

Kojima et al., Density, Molar Volume, and Surface Tension of Molten $Li_2CO_3$—$Na_2CO_3$ and $Li_2CO_3$—$K_2CO_3$ Containing Alkaline Earth (Ca, Sr, and Ba) Carbonates, Sep. 15, 2003, Journal of the Electrochemical Society, E535-E542 (Year: 2003).*

(Continued)

*Primary Examiner* — Ula C Ruddock
*Assistant Examiner* — Mary Grace Byram
(74) *Attorney, Agent, or Firm* — Foley & Lardner LLP

(57) ABSTRACT

A molten carbonate fuel cell assembly includes a cathode electrode; an anode electrode; an electrolyte matrix disposed between the cathode electrode and the anode electrode; a cathode current collector abutting the cathode electrode; and a first electrolyte composition stored in the cathode electrode, the first electrolyte composition comprising a first mixture of a eutectic Li/Na carbonate electrolyte doped with one or more additive materials, wherein the one or more additive materials comprise one or more of SrO, $BaCO_3$, BaO, $SrCO_3$, and combinations thereof.

10 Claims, 6 Drawing Sheets

(56) References Cited

U.S. PATENT DOCUMENTS

| | | | |
|---|---|---|---|
| 2002/0033659 A1 | 3/2002 | Nishikawa et al. | |
| 2008/0157419 A1* | 7/2008 | Ryu .................... | H01M 4/8875 264/104 |
| 2012/0021328 A1* | 1/2012 | Hilmi .................. | H01M 8/0254 429/478 |

OTHER PUBLICATIONS

International Search Report and Written Opinion for PCT/US2017/038575 dated Sep. 25, 2017 (8 pages).

Kojima et al.; Density, Molar Volume, and Surface Tension of Molten $Li_2CO_3$—$Na_2CO_3$ and $Li_2CO_3$—$K_2CO_3$ Containing Alkaline Earth (Ca, Sr, and Ba) Carbonates, Journal of The Electrochemical Society, vol. 150(11), Sep. 15, 2003; pp. E535-E542.

* cited by examiner

HIGH-PERFORMANCE ELECTROLYTE FOR MOLTEN CARBONATE FUEL CELL

RELATED APPLICATIONS

The present application is a U.S. national stage entry of PCT/US2017/038575, filed on Jun. 21, 2017, which claims priority to U.S. Provisional Application No. 62/353,267, filed on Jun. 22, 2016, both of which are hereby incorporated by reference in their entireties.

FIELD

Generally, this disclosure relates to fuel cells. More particularly, this disclosure relates to an electrolyte used in the fuel cells, a manufacturing method and a manufacturing system, and a fuel cell including such electrolytes.

BACKGROUND

A fuel cell is a device which converts chemical energy, such as energy stored in a hydrocarbon fuel, into electrical energy by way of an electrochemical reaction. Generally, a fuel cell includes an anode electrode and a cathode electrode separated by an electrolyte that serves to conduct electrically charged ions. High temperature fuel cells, such as molten carbonate fuel cell (MCFC) and solid oxide fuel cell, operate by passing a reactant fuel gas through the anode electrode, while oxidant gas (e.g., carbon dioxide and oxygen) is passed through the cathode electrode. In order to produce a desired power level, a number of individual fuel cells can be stacked in series. In operation, a fuel cell system can provide electrical power to a load, such as an electrical grid.

The carbonate fuel cell is of great interest for power generation, due to its high efficiency and clean conversion of chemical energy into electric energy. Generally carbonate fuel cell operates at intermediate temperatures (575° C.-700° C.) using carbonaceous fuel containing carbon dioxide and carbon monoxide. A typical fuel cell assembly consists of a porous Ni anode stabilized against sintering by Cr and/or Al additives and a porous in-situ oxidized and lithiated NiO cathode, separated by the molten alkali carbonate electrolyte ($Li_2CO_3/K_2CO_3$ or $Li_2CO_3/Na_2CO_3$) contained within a porous ceramic matrix ($LiAlO_2$).

Molten Carbonate Fuel Cells (MCFC) employ an electrolyte, which is solid at room temperature and liquid or molten at operating temperatures, which generally range between 575° C. and 665° C. These electrolytes include binary alkali metal carbonate compositions such as binary Lithium-potassium carbonate ($Li_2CO_3$—$K_2CO_3$) and binary lithium-sodium carbonate ($Li_2CO_3$—$Na_2CO_3$). 62$Li_2CO_3$/38$K_2CO_3$ (62Li/38K) and 52$Li_2CO_3$/48$Na_2CO_3$ (52Li/48Na) are the commonly compositions used in carbonate fuel cells.

It has been reported in the literature that the addition of Rb and/or Cs to the carbonate melt lowers the surface tension (T. Kojima, M. Yanagida, K. Tanimoto et al. Electrochemistry 67(6) (1999)). Rubidium and Cesium ions are larger than Li and Na ions and act as surfactant, which effectively decrease the surface tension of molten carbonate (Li/Na) and improves the gas solubility. However these additives may suffer from high vapor pressure, which may accelerate electrolyte loss and shorten cell life.

U.S. Pat. No. 5,942,345 to T. Kaun teaches that Li/Na electrolyte doped with relatively small amounts of $CaCO_3$ and $BaCO_3$ (and preferably of equimolar amounts) provides higher performance than the eutectic 52Li/48Na mainly at low temperature. It has been also claimed in this patent that LiNa doped with Ba and Ca additives is a non-segregating electrolyte, which may help maintaining uniform electrolyte composition during long-term cell operation.

German Patent (DE 10136156, Nov. 7, 2002) to Hoffmann Joachim discloses the use of Li/Na/Cs or Li/K/Cs or Li/K/Rb or Li/Na/Rb or mixtures of these compositions as electrolytes for molten carbonate fuel cells. Procedure to manufacture electrolyte by producing first $Li_2CO_3$ and $Na_2CO3$ and/or $K_2CO_3$ (in preference a eutectic) and mix it with another composition that contains Li and Cs and/or Rb (in preference a eutectic) is also disclosed. It has been disclosed that cathode in Li/Na/Cs electrolyte (made by mixing 52Li/48Na and 70Li/30Cs) exhibits better performance than in 62Li/38K at 650° C. due to low polarization.

Jack Winnick et al. (Electrochemical and solid-state letters 2(5) (1999) 207-209) claimed that $75Li_2CO_3/25Cs_2CO_3$ mixture could be used as a possible alternative electrolyte for MCFC. Short-term tests indicated that this composition has better performance than 62Li/38K and 52Li/48Na. Notice that 75Li/25Cs has a high melting point (>530° C.), cathode filling with this composition requires high temperature, which affects the cathode structure (shrinkage), cost and production yield.

Ota et al. (Journal of Power Sources 140 (2005) 258) indicated that the presence of $La_2O_3$ in 52Li/48Na electrolyte reduces the cathode NiO dissolution and increases the oxygen reduction reaction (ORR) due to an increased oxygen solubility. Studies carried out by S. Scaccia et al. (Journal of The Electrochemical Society 152 (11) (2005) A2155) claimed also that the addition of $La_2O_3$ in Li/Na improves the oxygen solubility. $La_2O_3$ additive has a limited solubility and higher melting point, which limit the benefit of $La_2O_3$ in terms of improving oxygen solubility and cell performance.

U.S. Pat. No. 8,557,468 to Hilmi et al. discloses a high-performance electrolyte for carbonate fuel cell comprising a cathode electrolyte made of a mixture of eutectic 52Li/48Na doped with one or more additives and one or more lithium precursors, wherein the additive materials include one or a mixture of $Rb_2CO_3$, $Cs_2CO_3$, $BaCO_3$, $La_2O_3$, $Bi_2O_3$, $Ta_2O_5$ and a second carbonate electrolyte stored in the cathode current collector that is the same or different from the first composition stored in the cathode.

Li/Na carbonate mixtures are known to exhibit advantages such as higher ionic conductivity, lower vapor pressure and lower cathode dissolution, but are disadvantageous in that they exhibit lower oxygen gas solubility which strongly affects the cell performance particularly at low temperatures (T<600° C.). For example, 52Li/48Na cells are known to exhibit lower performance than 62Li/38K cells due to high cathode polarization (caused by low oxygen solubility). Accordingly, in order to adopt Li/Na electrolyte for MCFC it is necessary to improve the performance mainly at low temperatures (T<620° C.) and reduce the surface tension.

The MCFC's which are currently used, typically store the electrolyte in cathode and/or cathode current collector (CCC) or simply in the matrix sandwiched between anode and cathode. Generally it is preferred to use low melting point mixtures (T<500° C.) to enable easy filling process and avoid any significant changes in electrodes structures, mainly cathode structure, that may occur during the filling process. In order to achieve high-performance and stable life with Li/Na based electrolyte, it is required that the electrolyte composition has (1) lower melting point (M.P. <500° C.); (2) lower vapor pressure additives to avoid electrolyte loss and performance degradation during long-term operation and (3) lower cathode polarization (performance loss) at low temperature (T<620° C.).

The above objectives are realized by the high-performance electrolyte of the present technology.

SUMMARY

In one embodiment, a molten carbonate fuel cell assembly comprises a cathode electrode; an anode electrode; an electrolyte matrix disposed between the cathode electrode and the anode electrode; a cathode current collector abutting the cathode electrode; and a first electrolyte composition stored in the cathode electrode, the first electrolyte composition comprising a first mixture of a eutectic Li/Na carbonate electrolyte doped with one or more additive materials, wherein the one or more additive materials comprise one or more of SrO, $BaCO_3$, BaO, $SrCO_3$, and combinations thereof.

In one aspect, the first electrolyte composition comprises at least 92 wt % of the first mixture.

In one aspect, the first mixture comprises 42 mol % to 48 mol % of $Li_2CO_3$, 38 mol % to 43 mol % of $Na_2CO_3$, and 11 mol % to 17 mol % of SrO.

In one aspect, the first mixture comprises 42 mol % to 48 mol % of $Li_2CO_3$, 38 mol % to 43 mol % of $Na_2CO_3$, 7 mol % to 13 mol % of SrO, and 1 mol % to 7 mol % of $BaCO_3$.

In one aspect, the first mixture comprises 42 mol % to 48 mol % of $Li_2CO_3$, 38 mol % to 43 mol % of $Na_2CO_3$, 5 mol % to 10 mol % of SrO, and 2 mol % to 6 mol % of BaO.

In one aspect, the first mixture comprises 42 mol % to 48 mol % of $Li_2CO_3$, 38 mol % to 43 mol % of $Na_2CO_3$, 2 mol % to 8 mol % of $SrCO_3$, and 1 mol % to 5 mol % of $BaCO_3$.

In one aspect, which is combinable with the above embodiments and aspects, the assembly further comprises a second electrolyte composition stored in at least the cathode current collector, the second electrolyte composition comprising an off-eutectic second mixture of $Li_2CO_3$ and $Na_2CO_3$.

In one aspect, the second mixture comprises 80 mol % or more of $Li_2CO_3$ and 20 mol % or less of $Na_2CO_3$.

In one aspect, the second mixture comprises 87 mol % to 90 mol % of $Li_2CO_3$ and 10 mol % to 13 mol % of $Na_2CO_3$.

In one aspect, the cathode current collector does not store therein any electrolyte doped with the one or more additive materials.

In another embodiment, an electrolyte composition for a cathode electrode of a molten carbonate fuel cell comprises: a mixture of eutectic Li/Na carbonate electrolyte doped with one or more additive materials, wherein the one or more additive materials comprise one or more of SrO, $BaCO_3$, BaO, $SrCO_3$, and combinations thereof.

In one aspect, the eutectic Li/Na carbonate electrolyte comprises 50 mol % to 54 mol % $Li_2CO_3$ and 46 mol % to 50 mol % $Na_2CO_3$; and the mixture comprises 80 mol % to 92 mol % of the eutectic Li/Na carbonate electrolyte and 8 mol % to 20 mol % of the one or more additive materials.

In one aspect, the additive materials comprise one or more of SrO, a combination of SrO and $BaCO_3$, a combination of SrO and BaO and a combination of $SrCO_3$ and $BaCO_3$.

In one aspect, the mixture comprises one of (a) 42 mol % to 48 mol % of $Li_2CO_3$, 38 mol % to 43 mol % of $Na_2CO_3$, and 11 mol % to 17 mol % of SrO; (b) 42 mol % to 48 mol % of $Li_2CO_3$, 38 mol % to 43 mol % of $Na_2CO_3$, 7 mol % to 13 mol % of SrO, and 1 mol % to 7 mol % of $BaCO_3$; (c) 42 mol % to 48 mol % of $Li_2CO_3$, 38 mol % to 43 mol % of $Na_2CO_3$, 5 mol % to 10 mol % of SrO, and 2 mol % to 6 mol % of BaO; (d) 42 mol % to 48 mol % of $Li_2CO_3$, 38 mol % to 43 mol % of $Na_2CO_3$, 2 mol % to 8 mol % of $SrCO_3$, and 1 mol % to 5 mol % of $BaCO_3$.

In another embodiment, a method of manufacturing a molten carbonate fuel cell assembly comprises: providing a molten carbonate fuel cell assembly comprising a cathode electrode, an anode electrode, an electrolyte matrix, and a cathode current collector abutting the cathode electrode; forming a first electrolyte composition comprising a first mixture of a first predetermined amount of eutectic Li/Na electrolyte composition doped with a second predetermined amount of one or more additive materials, wherein the one or more additive materials comprise one or more of SrO, $BaCO_3$, BaO, $SrCO_3$, and combinations thereof; and storing the first electrolyte composition in at least the cathode electrode of the molten carbonate fuel cell assembly.

In one aspect, the eutectic Li/Na carbonate electrolyte comprises 50 mol % to 54 mol % $Li_2CO_3$ and 46 mol % to 50 mol % $Na_2CO_3$; and the first mixture comprises 80 mol % to 92 mol % of the eutectic Li/Na carbonate electrolyte and 8 mol % to 20 mol % of the one or more additive materials.

In one aspect, the method of manufacturing a molten carbonate fuel cell assembly further includes forming a second electrolyte composition having a composition that is different form said first electrolyte composition; and storing said second electrolyte composition in at least said cathode current collector of said molten carbonate fuel cell assembly.

In one aspect, which is combinable with the above aspects and embodiments, the said second electrolyte composition comprises providing an off-eutectic electrolyte mixture of $Li_2CO_3$ and $Na_2CO_3$.

In one aspect, which is combinable with the above embodiments and aspects, the second electrolyte composition comprises an off-eutectic Li/Na electrolyte having a higher lithium carbonate content.

In one aspect, which is combinable with the above embodiments and aspects, the second electrolyte composition comprises an off-eutectic Li/Na electrolyte having about 80 mol % or more of $Li_2CO_3$ and about 20 mol % or less of $Na_2CO_3$.

In one aspect, the off-eutectic Li/Na electrolyte has about 87 mol % to about 90 mol % $Li_2CO_3$ and about 10 mol % to about 13 mol % $Na_2CO_3$.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the devices and/or processes described herein, as defined by the claims, will become apparent in the detailed description set forth herein and taken in conjunction with the accompanying drawings.

DETAILED DESCRIPTION

The present disclosure provides an advanced, high-performance Li/Na electrolyte design for molten carbonate fuel cells with low vapor pressure, high oxygen solubility and high-performance at low cell temperatures. The electrolyte includes additives which facilitate lowering the surface tension and improving the gas solubility in the melt and their implementation in the cell components. A MCFC assembly using the high-performance carbonate electrolytes and a method of manufacturing a MCFC assembly with the high-performance electrolytes are also described.

In accordance with another aspect of the present technology, a molten carbonate fuel cell assembly is provided, which includes a cathode electrode, an anode electrode, an electrolyte matrix disposed between the cathode electrode and the anode electrode, a cathode current collector abutting the cathode electrode, and at least a first electrolyte composition stored in the cathode electrode. In some embodiments, the first electrolyte composition is stored in at least the cathode electrode of the molten carbonate fuel cell assembly. In some embodiments, the molten carbonate fuel cell assembly further includes a second electrolyte composition. In some embodiments, the second electrolyte composition is stored in at least the cathode current collector of the molten carbonate fuel cell assembly.

Figure 1:
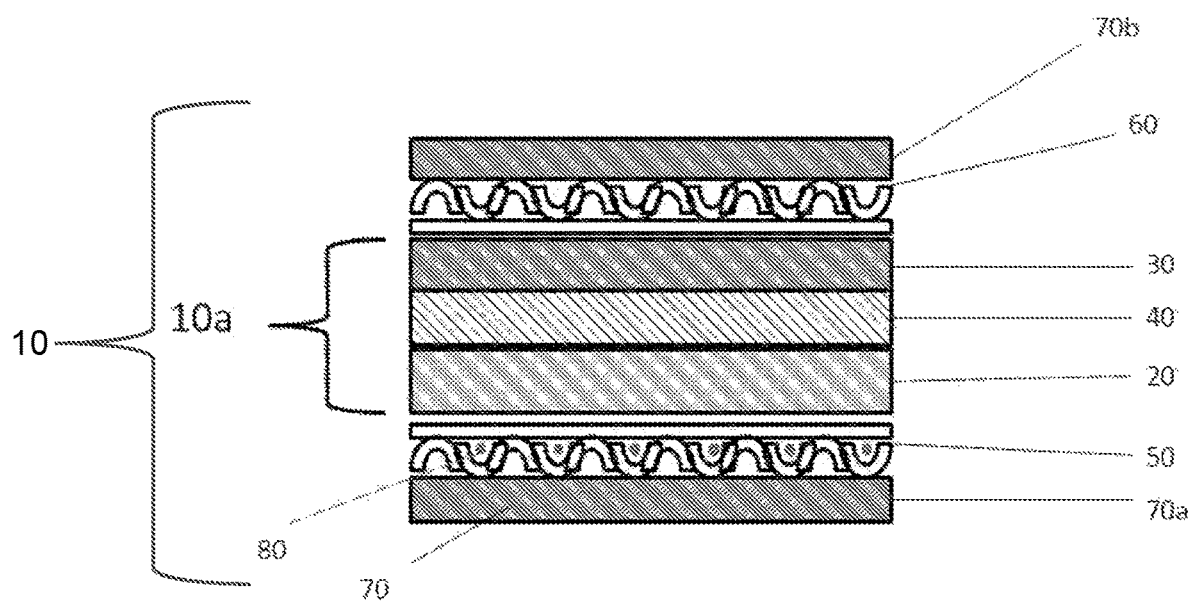
FIG. 1 shows a cross-sectional view of a molten carbonate fuel cell assembly having fuel cells using a high-performance electrolyte, in accordance with an embodiment of the present technology.

In the embodiment shown in FIG. 1, the molten carbonate fuel cell assembly 10 includes a fuel cell comprising an anode electrode 20 and a cathode electrode 30 separated by an electrolyte matrix 40. The fuel cell assembly 10 also includes an anode current collector 50 and a cathode current collector 60 which form gas channels for both fuel gas and oxidant gas. The fuel cell assembly 10 also includes a plurality of bipolar separator plate 70 for separating adjacent fuel cells of the assembly from one another. The bipolar plate 70a also separates the anode 20 and the anode current collector 50 of the fuel cell 10a from a fuel cell adjacent the anode side of the cell 10a, while the bipolar separator 70b separates the cathode 30 and the cathode current collector 60 of the cell 10a from a fuel cell adjacent the cathode side of the cell 10a. The fuel cell assembly 10 also includes reforming catalyst (80) in the gas channel of the anode current collector (50).

In accordance with one aspect the present technology, the first carbonate electrolyte is stored, prior to operation of the fuel cell and typically before assembly of the fuel cell stack, in at least the pores of the cathode electrode 30, and may also be stored in the porous electrolyte matrix 40 and/or the anode electrode 20. In the illustrative embodiments described below, the cathode electrode 30 is filled with first electrolyte composition. In an illustrative embodiment, the cathode electrode stores therein at least 90 wt % of the first electrolyte composition. After the cathode electrode is assembled into the fuel cell stack, and during conditioning and operation of the fuel cell, the first carbonate electrolyte stored in the cathode electrode melts and permeates the electrolyte matrix 40. In the illustrative embodiments described below, the cathode current collector 60 is filled with the second electrolyte composition.

The first and second electrolyte compositions are described in more detail herein below.

The first electrolyte composition includes a first mixture of a eutectic Li/Na carbonate electrolyte doped with one or more additive materials. In some embodiments, the first mixture is a eutectic mixture of $Li_2CO_3$—$Na_2CO_3$ doped with one or more additive materials which include one or more of SrO, $BaCO_3$, BaO, and $SrCO_3$, and combinations thereof. In some embodiments, the eutectic Li/Na carbonate electrolyte includes 50 mol % to 54 mol % $Li_2CO_3$ and 46 mol % to 50 mol % $Na_2CO_3$. In other embodiments, the eutectic Li/Na carbonate electrolyte includes 52 mol % $Li_2CO_3$ and 48 mol % $Na_2CO_3$.

In some embodiments, the additive materials include one or more of SrO, a combination of SrO and $BaCO_3$, a combination of SrO and BaO and a combination of $SrCO_3$ and $BaCO_3$. In some embodiments, the additive material includes SrO. In other embodiments, the additive material includes a combination of SrO and $BaCO_3$. In some embodiments, the additive material includes a combination of SrO and BaO. In some embodiments, the additive material includes a combination of $SrCO_3$ and $BaCO_3$.

In some embodiments, the first electrolyte composition includes a first predetermined amount of eutectic 52Li/48Na carbonate electrolyte, (i.e. 52 mol % $Li_2CO_3$ and 48 mol % $Na_2CO_3$), and a second predetermined amount of one or more additive materials selected from SrO, $BaCO_3$, BaO, and $SrCO_3$, and combinations thereof. In the first electrolyte composition, the predetermined amount of the eutectic 52Li/48Na carbonate electrolyte may range from about 55 wt % to about 95 wt %. This includes from about 60 wt % to about 90 wt %, about 65 wt % to about 85 wt %, or about 75 wt % to about 80 wt % of eutectic 52Li/48Na carbonate electrolyte relative to the total weight of the first electrolyte compositions, and ranges between any two of these values or less than any one of these values. In some embodiments, the first electrolyte composition includes a first mixture which includes from about 65 wt % to about 85 wt % of eutectic 52Li/48Na carbonate electrolyte. In other embodiments, the first electrolyte composition includes a first mixture which includes from about 92 wt % to about 99 wt % of eutectic 52Li/48Na carbonate electrolyte. In some embodiments, the first mixture of the first electrolyte composition includes from about 80 mol % to about 92 mol % of an eutectic mixture of 52 mol % $Li_2CO_3$ and 48 mol % $Na_2CO_3$.

In the first electrolyte composition, the predetermined amount of the one or more additive materials may range from about 5 wt % to about 45 wt % relative to the weight of the electrolyte. This includes from about 5 wt % to about 30 wt %, about 8 wt % to about 20 wt %, or about 10 wt % to about 15 wt % of additive relative to the weight of the electrolyte, and ranges between any two of these values or less than any one of these values. In some embodiments, the amount of one or more additive materials may range from 5 mol % to about 45 mol % relative to the weight of the electrolyte. This includes from about 5 mol % to about 30 mol %, about 8 mol % to about 20 mol %, or about 10 mol % to about 15 mol % and ranges between any two of these values or less than any one of these values. In some embodiments, the first electrolyte composition includes a first mixture which includes about 8 wt % to about 20 wt % of one or more additives. In some embodiments, the first electrolyte composition includes a first mixture which includes about 8 mol % to about 20 mol % of one or more additives.

In some embodiments, the first electrolyte composition includes a first mixture which includes between 8 wt % and 20 wt % of one or more additives such as SrO, a combination of SrO and $BaCO_3$, a combination of SrO and BaO and a combination of $SrCO_3$ and $BaCO_3$. In other embodiments, the first electrolyte composition includes between 8 mol % and 20 mol % of one or more additive materials such as SrO, a combination of SrO and $BaCO_3$, a combination of SrO and BaO and a combination of $SrCO_3$ and $BaCO_3$.

In some embodiments, the first mixture of the first electrolyte composition may include 40 mol % to 54 mol % of $Li_2CO_3$, 35 mol % to 45 mol % of $Na_2CO_3$, and 8 mol % to 20 mol % of SrO. In another illustrative embodiment, the first mixture of the first electrolyte composition may include 40 mol % to 54 mol % of $Li_2CO_3$, 35 mol % to 45 mol % of $Na_2CO_3$, 5 mol % to 15 mol % of SrO, and 0.5 mol % to 10 mol % of $BaCO_3$. In yet another illustrative embodiment, the first mixture of the first electrolyte composition may include 40 mol % to 54 mol % of $Li_2CO_3$, 35 mol % to 45 mol % of $Na_2CO_3$, 1 mol % to 15 mol % of SrO, and 1 mol % to 10 mol % of BaO. In another illustrative embodiment, the first mixture of the first electrolyte composition may include 42 mol % to 54 mol % of $Li_2CO_3$, 35 mol % to 45 mol % of $Na_2CO_3$, 1 mol % to 12 mol % of $SrCO_3$, and 1 mol % to 10 mol % of $BaCO_3$.

In an illustrative embodiment, the first mixture of the first electrolyte composition may include 42 mol % to 48 mol % of $Li_2CO_3$, 38 mol % to 43 mol % of $Na_2CO_3$, and 11 mol % to 17 mol % of SrO. In another illustrative embodiment, the first mixture of the first electrolyte composition may include 42 mol % to 48 mol % of $Li_2CO_3$, 38 mol % to 43 mol % of $Na_2CO_3$, 7 mol % to 13 mol % of SrO, and 1 mol % to 7 mol % of $BaCO_3$. In yet another illustrative embodiment, the first mixture of the first electrolyte composition may include 42 mol % to 48 mol % of $Li_2CO_3$, 38 mol % to 43 mol % of $Na_2CO_3$, 5 mol % to 10 mol % of SrO, and 2 mol % to 6 mol % of BaO. In another illustrative embodiment, the first mixture of the first electrolyte composition may include 42 mol % to 48 mol % of $Li_2CO_3$, 38 mol % to 43 mol % of $Na_2CO_3$, 2 mol % to 8 mol % of $SrCO_3$, and 1 mol % to 5 mol % of $BaCO_3$.

The second electrolyte composition may have a composition that is same or different from the first electrolyte composition. In some embodiments, the second electrolyte second electrolyte composition has a composition that is different from the first electrolyte composition. In some embodiments, the second electrolyte composition includes an eutectic Li/Na carbonate electrolyte. In some embodiments, the second electrolyte composition includes an off-eutectic Li/Na carbonate electrolyte. In some embodiments, the off-eutectic electrolyte mixture of the second electrolyte composition includes about 80 mol % or more of $Li_2CO_3$ and about 20 mol % or less of $Na_2CO_3$. In some embodiments, the off-eutectic Li/Na electrolyte has about 77 mol % to about 93 mol % of $Li_2CO_3$ and about 23 mol % to about 7 mol % of $Na_2CO_3$. In some embodiments, the off-eutectic Li/Na electrolyte of the second electrolyte composition includes about 80 mol % to about 90 mol % of $Li_2CO_3$ and about 20 mol % to about 10 mol % of $Na_2CO_3$, about 87 mol % to about 90 mol % $Li_2CO_3$ and about 10 mol % to about 13 mol % of $Na_2CO_3$ stored in the cathode current collector, and ranges between any two of these values or less than any one of these values.

In some embodiments, the molten carbonate fuel cell assembly includes a first electrolyte composition stored in the cathode electrode, and having a first mixture of eutectic $Li_2CO_3$—$Na_2CO_3$ doped with 8 wt % to 20 wt % (8 mol % to 20 mol %) of SrO, a combination of SrO and $BaCO_3$, a combination of SrO and BaO and a combination of $SrCO_3$ and $BaCO_3$, and a second electrolyte composition stored in the cathode current collector having an off-eutectic mixture of $Li_2CO_3$—$Na_2CO_3$.

In some embodiments, the first electrolyte composition is adapted to be stored in at least a cathode electrode of the molten carbonate fuel cell. In some embodiments, the second electrolyte composition is adapted to be stored in a portion of the molten carbonate fuel cell other than the cathode electrode. In some embodiments, the second electrolyte composition is adapted to be stored in at least the cathode current collector of the molten carbonate fuel cell.

In accordance with one aspect of the present technology, an electrolyte composition for a cathode electrode of a molten carbonate fuel cell is provided, wherein the electrolyte composition includes a mixture of eutectic Li/Na carbonate electrolyte doped with one or more additive materials, wherein the one or more additive materials include one or more of SrO, $BaCO_3$, BaO, $SrCO_3$, and combinations thereof.

In some embodiments, the electrolyte composition includes an eutectic Li/Na carbonate electrolyte which includes 50 mol % to 54 mol % $Li_2CO_3$ and 46 mol % to 50 mol % $Na_2CO_3$. In some embodiment, the electrolyte composition includes a mixture of eutectic Li/Na carbonate electrolyte doped with one or more additive materials, wherein the one or more additive materials wherein the mixture includes about 80 mol % to about 92 mol % of the eutectic Li/Na carbonate electrolyte, and about 8 mol % to about 20 mol % of the one or more additive materials which include one or more of SrO, $BaCO_3$, BaO, $SrCO_3$, and combinations thereof. In some embodiments, the electrolyte composition includes additive materials which include one or more of SrO, a combination of SrO and $BaCO_3$, a combination of SrO and BaO and a combination of $SrCO_3$ and $BaCO_3$.

In accordance with another aspect of the present technology, a high-performance electrolyte composition for use in a molten carbonate fuel cell is provided, wherein the high-performance electrolyte composition includes a first electrolyte composition and a second electrolyte composition. In some embodiments, the first electrolyte composition includes mixture of $Li_2CO_3$ and $Na_2CO_3$ doped with one or more additive materials, wherein the additive materials include one or more of SrO, a combination of SrO and $BaCO_3$, a combination of SrO and BaO and a combination of $SrCO_3$ and $BaCO_3$. In some embodiments, the second electrolyte composition has a composition that is different from the first electrolyte composition. In some embodiments, the second electrolyte composition of the second electrolyte composition stored in the cathode current collector includes an off-eutectic electrolyte mixture having a higher lithium carbonate content. In some embodiments, the second electrolyte composition includes an off-eutectic mixture of $Li_2CO_3$ and $Na_2CO_3$. In certain embodiments, the second electrolyte composition includes an off-eutectic Li/Na electrolyte having about 80 mol % or more of $Li_2CO_3$ and about 20 mol % or less of $Na_2CO_3$. In some embodiments, the off-eutectic Li/Na electrolyte has about 77 mol % to about 90 mol % of $Li_2CO_3$ and about 23 mol % to about 10 mol % of $Na_2CO_3$. In other embodiments, the off-eutectic Li/Na electrolyte has about 87 mol % to about 90 mol % $Li_2CO_3$ and about 10 mol % to about 13 mol % $Na_2CO_3$.

In some embodiments, at least 90 wt % of the first electrolyte composition is stored in the cathode electrode. This includes from about 90 wt % to about 100 wt %, about 90 wt % to about 98 wt %, about 90 wt % to about 95 wt %, about 92 wt % to about 99 wt % or about 94 wt % to about 98 wt % of the first electrolyte stored in the cathode electrode, and ranges between any two of these values or less than any one of these values. In some embodiments, at least 70 wt % of second electrolyte composition is stored in the cathode current collector. This includes from about 70 wt % to about 100 wt %, about 75 wt % to about 95 wt %, about 80 wt % to about 90 wt %, about 92 wt % to about 99 wt % or about 94 wt % to about 98 wt % of second electrolyte composition stored in the cathode current collector, and ranges between any two of these values or less than any one of these values. In other embodiments, at least 90 wt % of second electrolyte composition is stored in the cathode current collector. In some embodiments, the cathode current collector does not store therein any electrolyte doped with the one or more additive materials.

In accordance with one aspect of the present technology, a molten carbonate fuel cell assembly is provided, which includes a cathode electrode; an anode electrode; an electrolyte matrix disposed between the cathode electrode and the anode electrode; a cathode current collector abutting the cathode electrode; and a high-performance electrolyte composition which includes a first electrolyte composition which includes an eutectic Li/Na carbonated electrolyte comprising one of (a) 44.7 mol % of $Li_2CO_3$, 41.3 mol % of $Na_2CO_3$ and 14 mol % of SrO; (b) 44.7 mol % of $Li_2CO_3$, 41.3 mol % of $Na_2CO_3$, 10 mol % of SrO and 4 mol % of $BaCO_3$; (c) 45.7 mol % of $Li_2CO_3$, 42.3 mol % of $Na_2CO_3$, 8 mol % of SrO and 4 mol % of BaO; (d) 46.8 mol % of $Li_2CO_3$, 43.2 mol % of $Na_2CO_3$, 5 mol % of $SrCO_3$ and 5 mol % of $BaCO_3$; and the second electrolyte composition comprises an off-eutectic mixture of about 77 mol % to about 90 mol % of $Li_2CO_3$ and about 10 mole % to about 23 mol % of $Na_2CO_3$.

In accordance with yet another aspect of the present technology, provided is a method of manufacturing a molten carbonate fuel cell assembly, wherein the method includes providing a molten carbonate fuel cell assembly comprising a cathode electrode, an anode electrode, an electrolyte matrix, and a cathode current collector abutting the cathode electrode; forming a first electrolyte composition comprising a first mixture of a first predetermined amount of eutectic Li/Na electrolyte composition doped with a second predetermined amount of one or more additive materials, wherein the one or more additive materials comprise one or more of SrO, $BaCO_3$, BaO, $SrCO_3$, and combinations thereof; and storing the first electrolyte composition in at least the cathode electrode of the molten carbonate fuel cell assembly.

In some embodiments, the method of manufacturing a molten carbonate fuel cell assembly with a high-performance electrolyte is achieved by storing in at least the cathode electrode the first electrolyte composition comprising a first predetermined amount of eutectic 52Li/48Na carbonate electrolyte, i.e. 52 mol % $Li_2CO_3$ and 48 mol % $Na_2CO_3$, and a second predetermined amount of one or more additive materials selected from SrO, $BaCO_3$, BaO, and $SrCO_3$, and combinations thereof, and storing in at least the cathode current collector a second electrolyte composition comprising 80 mol % or more of $Li_2CO_3$ and 20 mol % or less of $Na_2CO_3$.

In certain embodiments, the method of manufacturing a molten carbonate fuel cell assembly with a high-performance electrolyte is achieved by forming a second electrolyte composition which includes providing an off-eutectic electrolyte mixture of $Li_2CO_3$ and $Na_2CO_3$ and storing in at least the cathode current collector of the molten carbonate fuel cell assembly. In certain embodiments, the second electrolyte composition comprises an off-eutectic Li/Na electrolyte having higher lithium carbonate content. In some embodiments forming the second electrolyte composition includes providing the off-eutectic mixture of $Li_2CO_3$ and $Na_2CO_3$ comprising 80 mol % or more of $Li_2CO_3$ and 20 mol % or less of $Na_2CO_3$.

In certain embodiments of the method of manufacturing a molten carbonate fuel cell assembly with a high-performance electrolyte, the first predetermined amount of eutectic Li/Na electrolyte doped with one or more additive materials is between 65 wt % and 85 wt % of first electrolyte composition, the second predetermined amount of the one or more additive materials is between 8 mol % and 20 mol % of the eutectic Li/Na electrolyte doped with one or more additive materials. In certain embodiments of the method of manufacturing a molten carbonate fuel cell assembly with a high-performance electrolyte, the first predetermined amount of eutectic Li/Na electrolyte doped with one or more additive materials is between 92 wt % and 99 wt % of first electrolyte composition, the second predetermined amount of the one or more additive materials is between 8 mol % and 20 mol % of the eutectic Li/Na electrolyte doped with one or more additive materials.

In one aspect, provided is a method of manufacturing a molten carbonate fuel cell assembly with a high-performance electrolyte composition, the molten carbonate fuel cell assembly comprising a cathode electrode, an anode electrode, an electrolyte matrix, at least a cathode current collector abutting the cathode electrode, wherein the method includes forming a first electrolyte composition comprising a first mixture of a first predetermined amount of eutectic Li/Na electrolyte composition doped with a second predetermined amount of one or more additive materials, wherein the one or more additive materials comprise one or more of SrO, $BaCO_3$, BaO, $SrCO_3$, and combinations thereof; and storing the first electrolyte composition in at least the cathode electrode of the molten carbonate fuel cell assembly. In some embodiments, the method includes forming a first electrolyte composition by mixing a first predetermined amount of Li/Na electrolyte composition doped with a second predetermined amount of one or more additive materials, wherein the additive materials include one or more of SrO, a combination of SrO and $BaCO_3$, a combination of SrO and BaO and a combination of $SrCO_3$ and $BaCO_3$; and storing the first electrolyte composition in at least the cathode electrode of the molten carbonate fuel cell assembly.

In some embodiments, the method further includes forming a second electrolyte composition having a composition that is different form the first electrolyte composition; and storing the second electrolyte composition in at least the cathode current collector of the molten carbonate fuel cell assembly.

In some embodiments, the first electrolyte composition is stored, prior to operation of the fuel cell and typically before assembly of the fuel cell stack, in at least the pores of the cathode electrode, and may also be stored in the porous electrolyte matrix and/or the anode electrode. In the illustrative embodiments described below, the cathode electrode is filled with the first electrolyte composition which includes a first mixture of Li/Na carbonate electrolyte doped with a second predetermined amount of one or more additive materials during the manufacturing process and prior to assembly into the fuel cell. In some embodiments, a predetermined amount of the second electrolyte composition is stored in the cathode current collector, for example in pre-selected passages formed by the cathode current collector. In some embodiments, the second carbonate electrolyte can also be stored in pre-selected passages of the anode current collector. In some embodiments, at least 90 wt % of the first electrolyte composition is stored in the cathode electrode and at least 70 wt % to at least 90 wt % of the total electrolyte, including the first electrolyte composition and the second electrolyte composition, is stored in the cathode electrode.

In one aspect, provided is a method of manufacturing a molten carbonate fuel cell assembly with a high-performance electrolyte composition, the molten carbonate fuel cell assembly comprising a cathode electrode, an anode electrode, an electrolyte matrix, at least a cathode current collector abutting the cathode electrode, wherein the method includes providing a first electrolyte composition which includes a first mixture formed by mixing 80 mol % to 92 mol % of eutectic Li/Na carbonate electrolyte doped with 8 mol % to 20 mol % of one or more additive materials, wherein the additive materials include one or more of SrO, a combination of SrO and $BaCO_3$, a combination of SrO and BaO and a combination of $SrCO_3$ and $BaCO_3$; and storing the first electrolyte composition in at least the cathode electrode of the molten carbonate fuel cell assembly. In some embodiments, the method further includes forming a second electrolyte composition by forming an off-eutectic mixture of 80 mol % or more of $Li_2CO_3$ and 20 mol % or less of $Na_2CO_3$; and storing the second electrolyte composition in at least the cathode current collector of the molten carbonate fuel cell assembly. In some embodiments of the method the first electrolyte composition and the second electrolyte compositions can be formed according to compositions described hereinabove.

The high-performance electrolyte of the present technology provides several advantages such as improve the performance of Li/Na cells over the conventional 52Li/48Na by more than 100 mV at T<600 C, eliminate the issue of lower performance of Li/Na carbonate fuel cell at T<620 C, reduce Li/Na electrolyte surface tension and improve oxygen solubility at low temperatures and extend cell life by reducing electrolyte vapor loss.

Specific examples of illustrative electrolyte compositions and methods of forming such compositions are described below.

Example 1

In order to highlight the benefit of Li/Na designs disclosed herein, tests were performed in bench-scale button cells (3 $cm^2$) using the high-performance electrolyte of this example at the current density of 160 mA/$cm^2$, low utilization of 5% to evaluate the effect of temperature (mainly at T<600° C.) on cathode polarization and cell performance. Each button cell assembly consists of a porous Ni—Al and/or Ni—Cr anode (or a mixture of Ni—Al—Cr) and a porous in-situ oxidized and lithiated NiO cathode, separated by a porous ceramic matrix ($LiAlO_2$). In this illustrative embodiment, the high-performance Li/Na electrolyte comprises the first carbonate electrolyte having the first electrolyte composition stored in the cathode electrode and the second carbonate electrolyte having the second composition different from the first electrolyte composition stored in the cathode current collector. In this example, the cathode electrode was filled with the first electrolyte composition mixture of 0.25 grams of 44.7 mol % of $Li_2CO_3$, 41.3 mol % of $Na_2CO_3$ and 14 mol % of SrO as the additive material. The cathode current collector stored therein 0.25 grams of the off-eutectic 87 mol % $Li_2CO_3$/13 mol % $Na_2CO_3$ electrolyte to achieve the electrolyte balance required for life.

Figure 2:
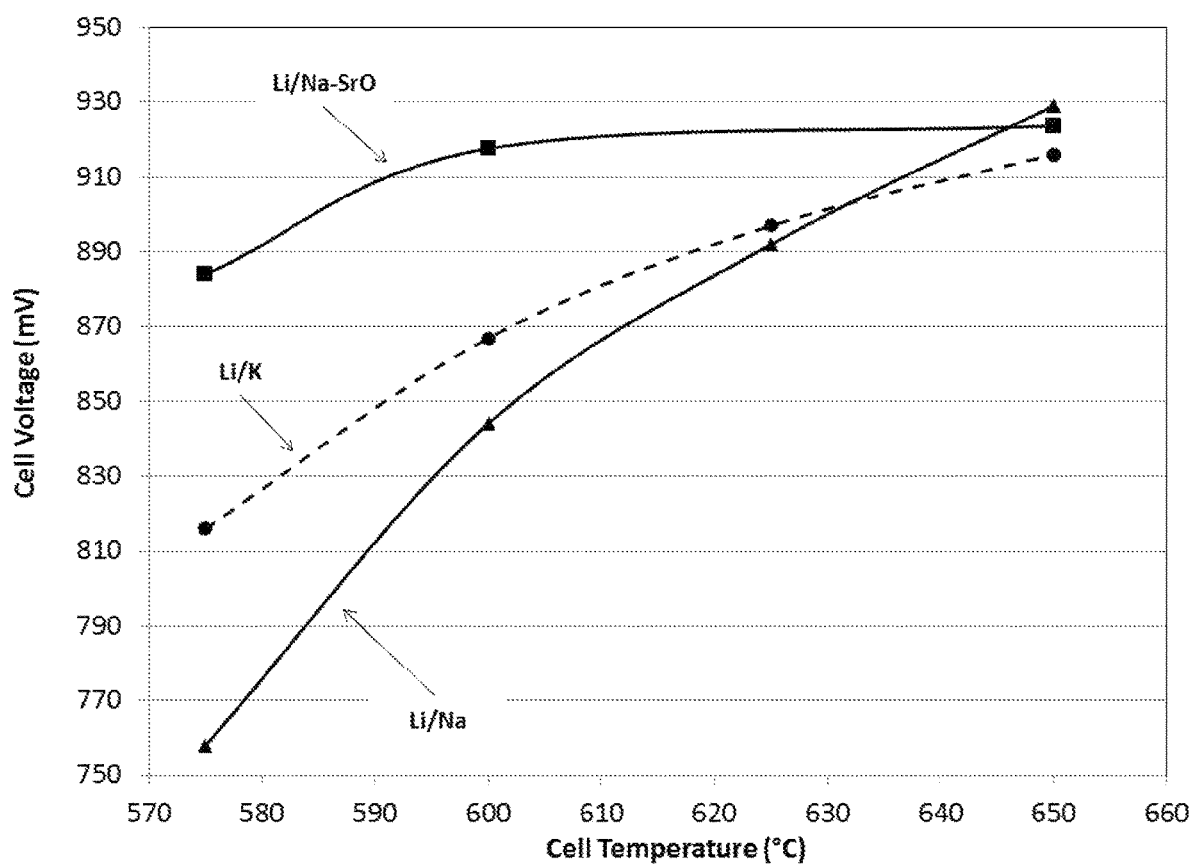
FIG. 2 shows a graph of the effect of temperature on cell performance (button cells (3 $cm^2$)) of advanced Li/Na (Li/Na—SrO) vs. conventional electrolyte compositions (Li/Na and Li/K) at 160 mA/$cm^2$ and low utilization (~5%).
Figure 3:
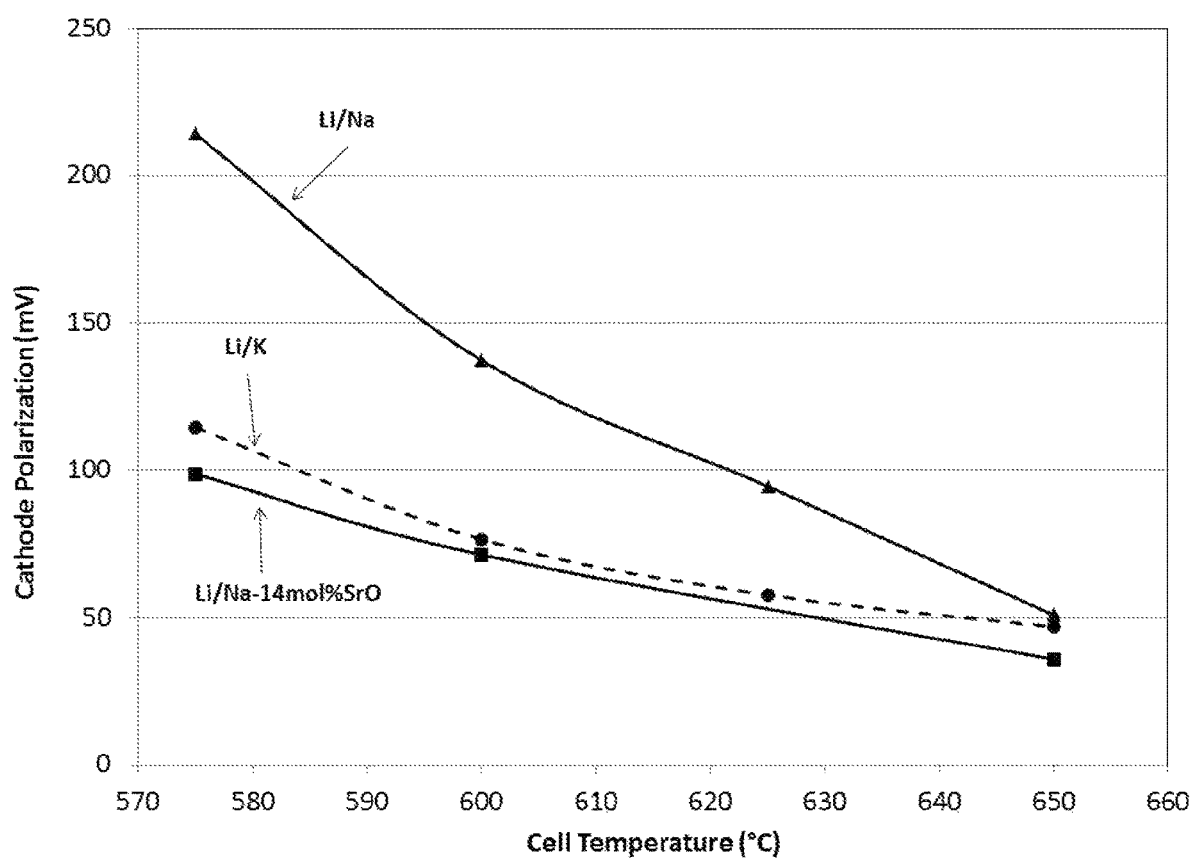
FIG. 3 shows a graph of the effect of temperature on cathode polarization in LiNa with 14 mol % SrO in comparison with other electrolytes.

The results of the tests performed in button cells at different operating temperatures are shown in FIG. 2, which shows a graph of the effect of operating temperature on the performance of button cells using the high-performance Li/Na electrolyte and other electrolytes. In FIG. 2, the X-axis represents the operating temperature of the fuel cell while the Y-axis represents the cell potential in mV at 160 mA/$cm^2$. As shown in FIG. 2, the cell potential of button cells with the high-performance Li/Na electrolyte of this example was higher than the cell potentials of the button cells with the conventional electrolytes, particularly at the operating temperatures of 600° C. or less. For example, polarization studies at low temperature (575-600° C.) show that the advanced Li/Na—SrO exhibits >120 mV cell performance improvement compared to conventional eutectic 52Li/48Na and >60 mV compared to 62Li/38K. This improvement stems from low cathode polarization due to reduced surface tension and improved oxygen solubility. In addition, cathode polarization in button cells using high-performance Li/Na electrolyte of this example was compared to cathode polarization of button cells with the high Li Li/Na electrolyte. The results of these tests are shown in FIG. 3, which shows a graph of cathode polarization in button cells at different temperatures, and in which the X-axis represents the operating temperature while the Y-axis represents cathode polarization in mV at 160 mA/$cm^2$. As shown in FIG. 3, cathode polarization in the button cells with the high-performance Li/Na electrolyte of this example was reduced by >115 mV compared to 52Li/48Na and 15-20 mV compared to 62Li/38K. These results confirm the benefit of SrO additive in terms of improving performance at low temperature and reducing cathode loss.

Example 2

Figure 4:
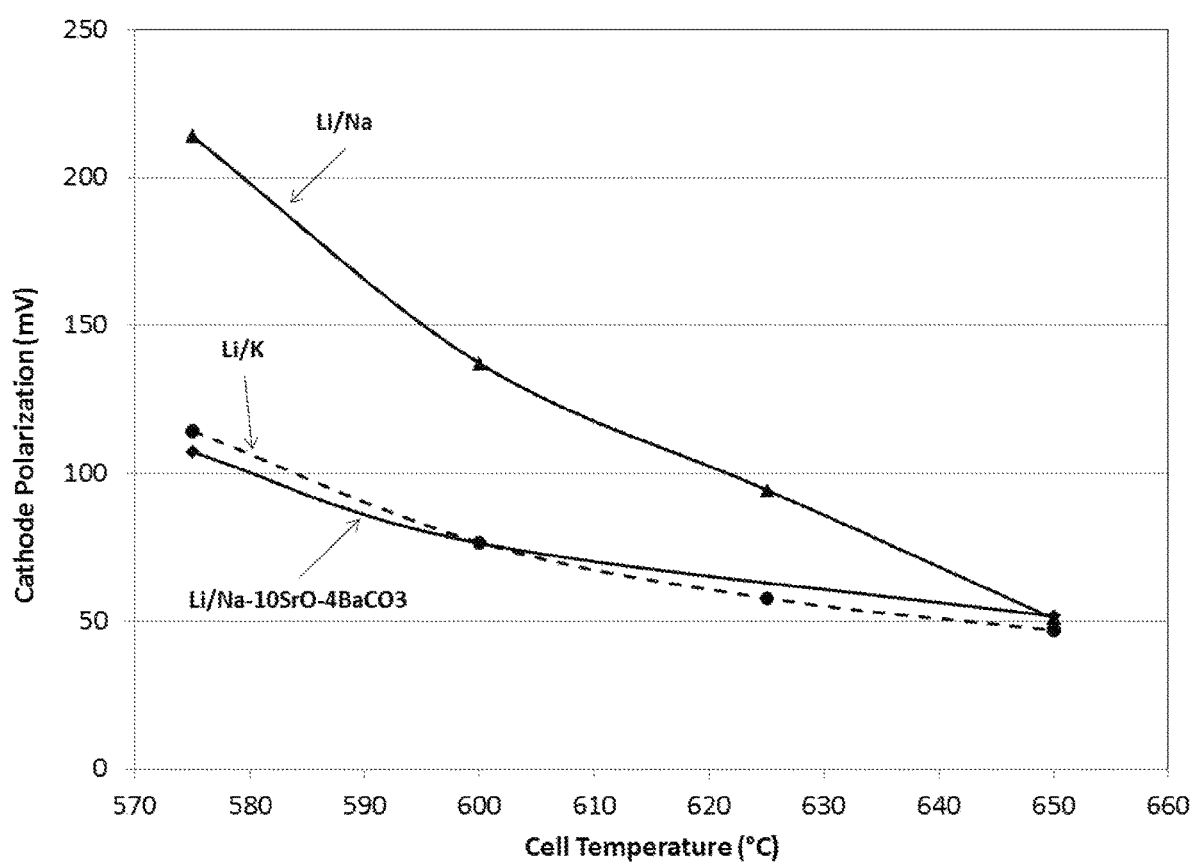
FIG. 4 shows a graph of the effect of temperature on cathode polarization in different electrolytes with 10 mol % of SrO and 4 mol % of $BaCO_3$ additive at 160 $mA/cm^2$ and low utilization.

The procedure of Example 1 was repeated except with 10 mol % of SrO and 4 mol % of $BaCO_3$ as the additive material. The results are shown in FIG. 4. The system showed also excellent improvement in cathode polarization reduction at T<600° C. Improved performance at low temperature would enable extended cell life due to reduced electrolyte loss (vapor loss), and hardware corrosion.

Comparative Example 3

Comparative tests were conducted using the Li/Na electrolyte doped with Ba and Ca additives, such as disclosed in U.S. Pat. No. 5,942,345. The tests showed very minor performance improvement at T<620° C. compared to the conventional eutectic electrolyte (52Li/48Na). The overall cell performance with LiNaBaCa remains >100 mV lower than Li/K cells at a wide range of temperatures (575° C. to 650° C.). Although Ba and Ca additives may have lower vapor pressure, their addition into Li/Na electrolyte does not eliminate high surface tension and poor oxygen solubility issues under MCFC operating conditions. Button cell tests (3 $cm^2$) showed that the cathode polarization in Li/Na doped with Ba and Ca (2-10 mol %) is two-times higher than cathode polarization in Li/K (190 mV vs. 114 mV at T=575°

Figure 5:
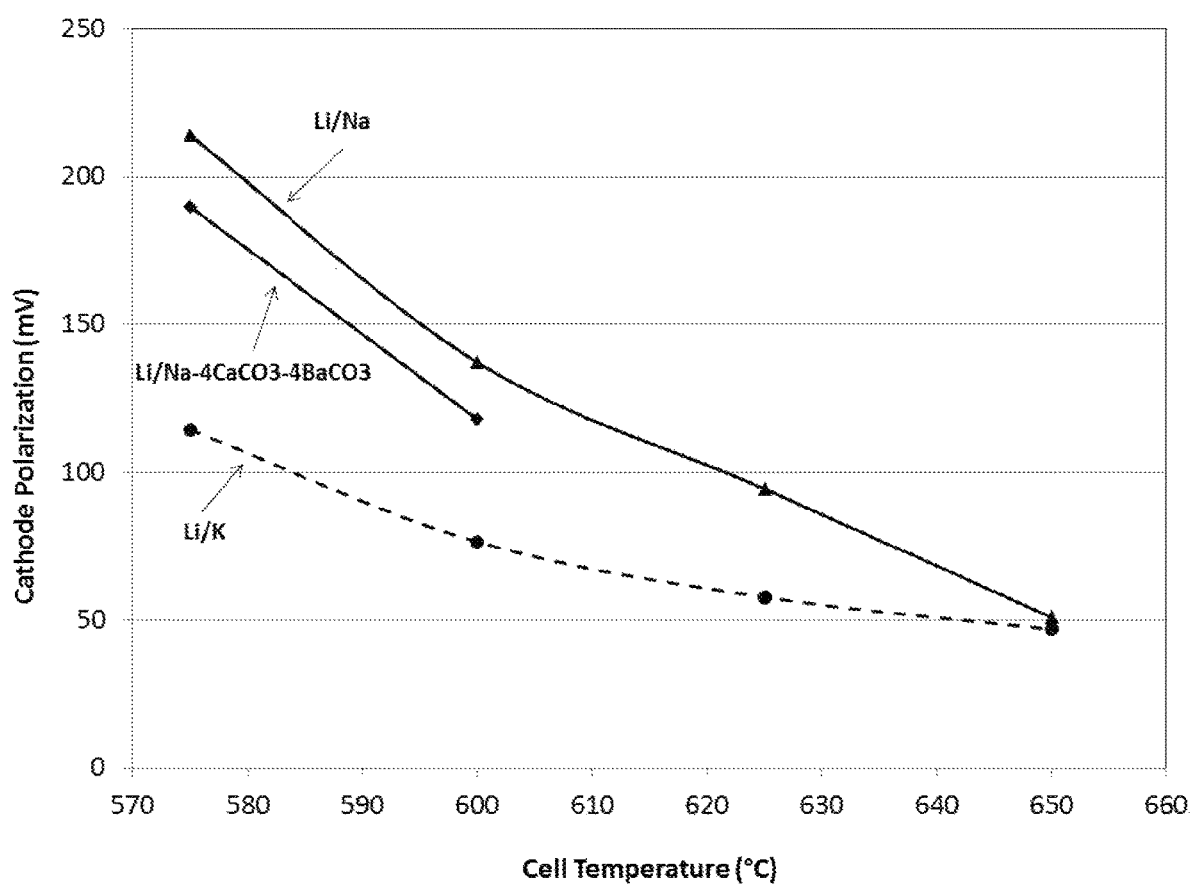
FIG. 5 shows a graph of the effect of temperature on cathode polarization in different electrolytes with 4 mol % of $CaCO_3$ and 4 mol % of $BaCO_3$ additive at 160 $mA/cm^2$.

C. and 160 mA/cm$^2$ and 5.5% fuel utilization). This is evident from FIG. 5 which highlights the poor cathode performance of LiNa with 4 mol % CaCO$_3$+4 mol % BaCO$_3$ at 575° C. and 160 mA/cm$^2$.

Similarly, electrolyte compositions with Rb and Cs additives disclosed in the German patent DE 10136156 were tested and showed much lower performance than 62Li/38K. In addition these additives may exhibit higher vapor pressure which may impact the electrolyte inventory for long-term operation, reducing cell life and the overall performance mainly at low temperatures.

The above examples describe the specific compositions of the high-performance Li/Na electrolyte and the test results showing improved performance of the fuel cells and cathodes using the high-performance Li/Na electrolyte compared to fuel cells using conventional electrolytes. In addition to the compositions described in the above examples, similar improvements can be observed in high-performance Li/Na electrolyte using SrCO$_3$+BaO as the additive materials in at least the first carbonate electrolyte, or using storing additives (SrO and/or SrO+BaCO$_3$ and/or SrCO$_3$/BaO) or a portion of the electrolyte mixture (Li/Na+SrO or Li/Na (SrO+BaCO$_3$) in the matrix green tape or storing a eutectic or an off-eutectic electrolyte compositions containing additives (SrO, SrO+BaCO$_3$).

In all cases it is understood that the above-described arrangements are merely illustrative of the many possible specific embodiments which represent applications of the present technology. Numerous and varied other arrangements, including use of different amounts of components in the high-performance electrolyte, can be readily devised in accordance with the principles of the present technology without departing from the spirit and scope of the invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present technology. For example, the heat recovery heat exchangers may be further optimized.

Figure 6:
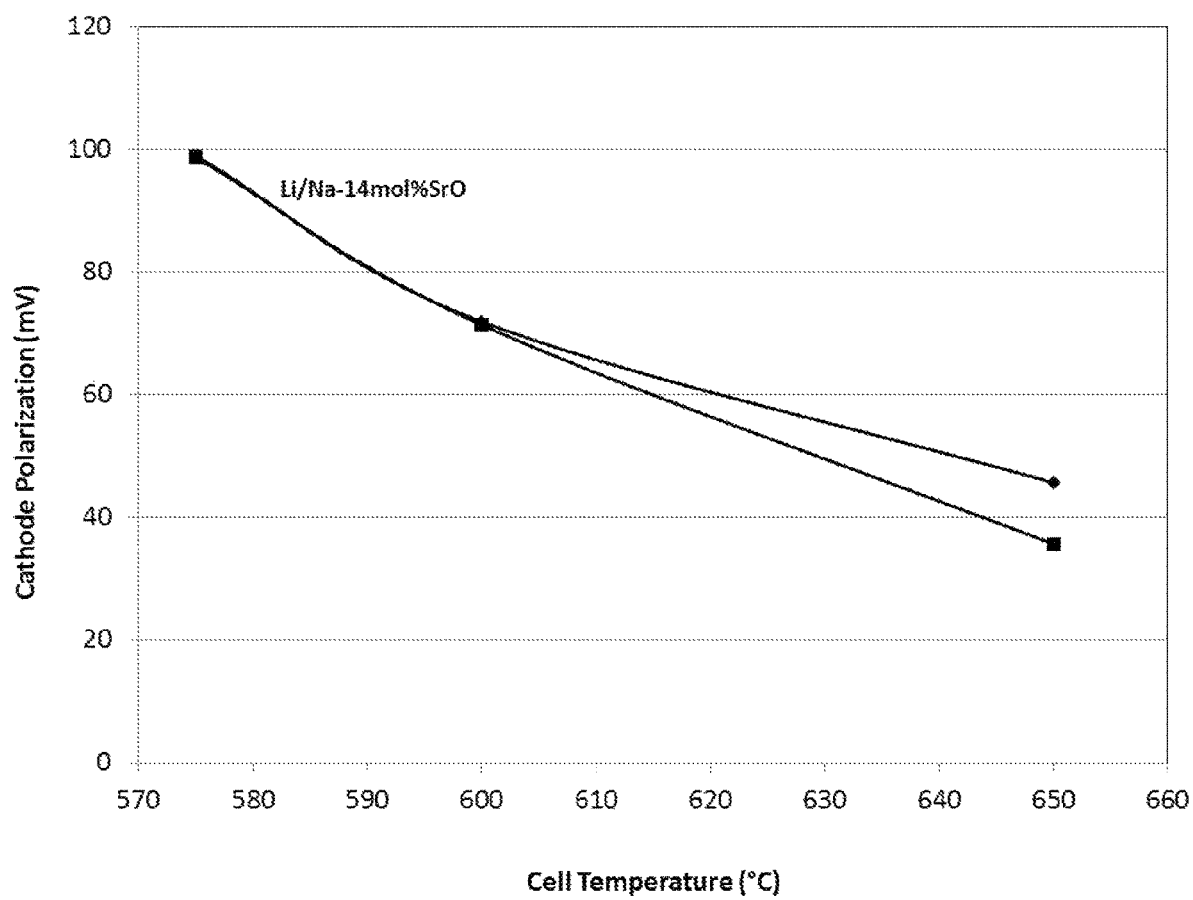
FIG. 6 shows a graph demonstrating the reproducibility of cathode polarization in with Li/Na-14 mol % of SrO electrolyte.

The consistency and reproducibility of LiNa electrolyte with SrO additive was investigated 2-3 button cells. The high-performance Li/Na electrolyte comprises the first carbonate electrolyte having the first electrolyte composition stored in the cathode electrode and the second carbonate electrolyte having the second composition different from the first electrolyte composition stored in the cathode current collector. In all these button cell tests, the cathode electrode was filled with the first electrolyte composition mixture of 0.25 grams of 44.7 mol % of Li$_2$CO$_3$, 41.3 mol % of Na$_2$CO$_3$ and 14 mol % of SrO as the additive material. The cathode current collector stored therein 0.25 grams of the off-eutectic 87 mol % Li$_2$CO$_3$/13 mol % Na$_2$CO$_3$ electrolyte to achieve the electrolyte balance required for life. As shown in FIG. 6, the results showed good reproducibility in terms of cathode performance at low cell temperature. >100 mV reduction of cathode polarization is achieved with high-performance LiNa14 mol % SrO compared to baseline 52 mol % Li/48 mol % Na, confirming the superiority of this innovative electrolyte composition.

What is claimed is:

1. A molten carbonate fuel cell assembly comprising:
a cathode electrode;
an anode electrode;
an electrolyte matrix disposed between the cathode electrode and the anode electrode;
a cathode current collector abutting the cathode electrode; and
a first electrolyte composition stored in the cathode electrode, the first electrolyte composition comprising a first mixture of a eutectic Li/Na carbonate electrolyte doped with one or more additive materials, wherein the one or more additive materials comprise a combination of SrO and BaCO$_3$ or a combination of SrCO$_3$ and BaCO$_3$;
wherein:
the eutectic Li/Na carbonate electrolyte comprises 50 mol % to 54 mol % Li$_2$CO$_3$ and 46 mol % to 50 mol % Na$_2$CO$_3$; and
the first mixture comprises:
(a) 42 mol % to 48 mol % of Li$_2$CO$_3$, 38 mol % to 43 mol % of Na$_2$CO$_3$, 7 mol % to 13 mol % of SrO and 1 mol % to 7 mol % of BaCO$_3$; or
(b) 42 mol % to 48 mol % of Li$_2$CO$_3$, 38 mol % to 43 mol % of Na$_2$CO$_3$, 2 mol % to 8 mol % of SrCO$_3$ and 1 mol % to 5 mol % of BaCO$_3$.

2. The molten carbonate fuel cell assembly in accordance with claim 1, wherein the first electrolyte composition comprises at least 92 wt % of the first mixture.

3. The molten carbonate fuel cell assembly in accordance with claim 1, further comprising a second electrolyte composition stored in at least the cathode current collector, the second electrolyte composition comprising an off-eutectic second mixture of $Li_2CO_3$ and $Na_2CO_3$.

4. The molten carbonate fuel cell assembly in accordance with claim 3, wherein the second mixture comprises 80 mol % or more of $Li_2CO_3$ and 20 mol % or less of $Na_2CO_3$.

5. The molten carbonate fuel cell assembly in accordance with claim 4, wherein the second mixture comprises 87 mol % to 90 mol % of $Li_2CO_3$ and 10 mol % to 13 mol % of $Na_2CO_3$.

6. The molten carbonate fuel cell assembly in accordance with claim 1, wherein the cathode current collector does not store therein any electrolyte doped with the one or more additive materials.

7. An electrolyte composition for a cathode electrode of a molten carbonate fuel cell, the electrolyte composition comprising:
   a mixture of eutectic Li/Na carbonate electrolyte doped with one or more additive materials, wherein the one or more additive materials comprise a combination of SrO and $BaCO_3$ or a combination of $SrCO_3$ and $BaCO_3$;
   wherein:
   the eutectic Li/Na carbonate electrolyte comprises 50 mol % to 54 mol % $Li_2CO_3$ and 46 mol % to 50 mol % $Na_2CO_3$; and
   the mixture comprises:
   (a) 42 mol % to 48 mol % of $Li_2CO_3$, 38 mol % to 43 mol % of $Na_2CO_3$, 7 mol % to 13 mol % of SrO and 1 mol % to 7 mol % of $BaCO_3$; or
   (b) 42 mol % to 48 mol % of $Li_2CO_3$, 38 mol % to 43 mol % of $Na_2CO_3$, 2 mol % to 8 mol % of $SrCO_3$ and 1 mol % to 5 mol % of $BaCO_3$.

8. A method of manufacturing a molten carbonate fuel cell assembly, the method comprising:
   providing a molten carbonate fuel cell assembly comprising a cathode electrode, an anode electrode, an electrolyte matrix, and a cathode current collector abutting the cathode electrode;
   forming a first electrolyte composition comprising a first mixture of a first predetermined amount of eutectic Li/Na electrolyte composition doped with a second predetermined amount of one or more additive materials, wherein the one or more additive materials comprise a combination of SrO and $BaCO_3$ or a combination of $SrCO_3$ and $BaCO_3$; and
   storing the first electrolyte composition in at least the cathode electrode of the molten carbonate fuel cell assembly;
   wherein:
   the eutectic Li/Na carbonate electrolyte comprises 50 mol % to 54 mol % $Li_2CO_3$ and 46 mol % to 50 mol % $Na_2CO_3$; and
   the first mixture comprises 80 mol % to 92 mol % of the eutectic Li/Na carbonate electrolyte and 8 mol % to 20 mol % of the one or more additive materials.

9. A method of manufacturing a molten carbonate fuel cell assembly in accordance with claim 8, further comprising:
   forming a second electrolyte composition that is different form the first electrolyte composition; and
   storing the second electrolyte composition in at least the cathode current collector.

10. A method of manufacturing a molten carbonate fuel cell assembly in accordance with claim 9, wherein the second electrolyte composition comprises an off-eutectic second mixture of $Li_2CO_3$ and $Na_2CO_3$ comprising 80 mol % or more of $Li_2CO_3$ and 20 mol % or less of $Na_2CO_3$.

* * * * *